(12) United States Patent
Kiyohara et al.

(10) Patent No.: US 9,177,196 B2
(45) Date of Patent: Nov. 3, 2015

(54) VEHICLE PERIPHERY MONITORING SYSTEM

(75) Inventors: Masahiro Kiyohara, Hitachinaka (JP); Shoji Muramatsu, Hitachinaka (JP); Kota Irie, Sagamihara (JP); Yoshitaka Uchida, Koriyama (JP)

(73) Assignee: Clarion Co., Ltd., Saitama-shi (JP)

( * ) Notice: Subject to any disclaimer, the term of this patent is extended or adjusted under 35 U.S.C. 154(b) by 657 days.

(21) Appl. No.: 13/532,912

(22) Filed: Jun. 26, 2012

(65) Prior Publication Data

US 2012/0327236 A1    Dec. 27, 2012

(30) Foreign Application Priority Data

Jun. 27, 2011    (JP) ................. 2011-142258

(51) Int. Cl.
 *H04N 7/18*    (2006.01)
 *G06K 9/00*    (2006.01)

(52) U.S. Cl.
 CPC ........ *G06K 9/00369* (2013.01); *G06K 9/00805* (2013.01)

(58) Field of Classification Search
 CPC ........ H04N 7/18; G06K 9/00; G06K 9/00369
 USPC ............... 348/148; 382/104, 106, 103
 See application file for complete search history.

(56) References Cited

U.S. PATENT DOCUMENTS

| | | | |
|---|---|---|---|
| 6,327,536 B1 | 12/2001 | Tsuji et al. | |
| 6,636,257 B1 | 10/2003 | Harada et al. | |
| 2004/0095374 A1* | 5/2004 | Jojic et al. | 345/716 |
| 2007/0171033 A1 | 7/2007 | Nagaoka et al. | |
| 2007/0274566 A1 | 11/2007 | Fujimoto | |
| 2007/0291987 A1* | 12/2007 | Saka et al. | 382/103 |
| 2009/0041302 A1 | 2/2009 | Nagaoka et al. | |
| 2011/0228985 A1 | 9/2011 | Uchida et al. | |
| 2013/0243261 A1* | 9/2013 | Matsuda et al. | 382/106 |

FOREIGN PATENT DOCUMENTS

| | | |
|---|---|---|
| EP | 2 023 267 A1 | 2/2009 |
| JP | 2000-149196 A | 5/2000 |
| JP | 2001-6096 A | 1/2001 |
| JP | 2001-204013 A | 7/2001 |
| JP | 2005-101758 A | 4/2005 |
| JP | 2008-15771 A | 1/2006 |
| JP | 2007-213561 A | 8/2007 |
| JP | 2009-42941 A | 2/2009 |

(Continued)

OTHER PUBLICATIONS

Japanese Office Action dated Jan. 28, 2014 (Two (2) pages).

(Continued)

*Primary Examiner* — Sath V Perungavoor
*Assistant Examiner* — Amadihe Kennon
(74) *Attorney, Agent, or Firm* — Crowell & Moring LLP (57) ABSTRACT

With a simple configuration, a vehicle periphery monitoring system that easily detects pedestrian that has a possibility to collide with a vehicle to which the monitoring system is installed. Based on a change rate in the size of the image of the observation object captured at a preset time interval by an onboard camera 111 and the presence or absence of the deformation of the observation object image between the captured images, it is determined whether the observation object is a pedestrian relatively approaching the vehicle to which the monitoring system is installed.

8 Claims, 6 Drawing Sheets

(56) References Cited

FOREIGN PATENT DOCUMENTS

| | | | |
|---|---|---|---|
| JP | 2009-294842 | A | 12/2009 |
| JP | 2010-128919 | A | 6/2010 |
| JP | 2010-152873 | A | 7/2010 |
| JP | 2010-244194 | A | 10/2010 |
| JP | 2010-257229 | A | 11/2010 |

OTHER PUBLICATIONS

Chinese Office Action with English Translation dated Dec. 23, 2013 (Five (5) pages).
Japanese-language Office Action with English translation dated Jul. 23, 2013 (5 pages).
Japanese Office Action dated Jul. 29, 2014 (Three (3) pages).

* cited by examiner

VEHICLE PERIPHERY MONITORING SYSTEM

BACKGROUND OF THE INVENTION

1. Field of the Invention

The present invention relates to a vehicle periphery monitoring system that detects a pedestrian having a possibility to approach a vehicle to which the monitoring system is installed based on an image of a vehicle periphery captured by an onboard camera.

2. Background Art

Conventionally, vehicle periphery monitoring systems are proposed that are configured to have two cameras installed on one vehicle and detect, based on the principle of trigonometrical survey, a distance between a monitoring object and the vehicle based on an offset (parallax) between image areas of a same monitoring object extracted from the images of the vehicle periphery captured by the two cameras (see, for example, JP Patent Publication (Kokai) No. 2001-6096A.)

According to the conventional vehicle periphery monitoring system, a distance between the monitoring object in the vehicle periphery and the vehicle is calculated, and conversion is performed on the image coordinates of the position of the monitoring object to its real-space coordinates based on the distance to obtain a movement vector of the monitoring object in the real-space, and the possibility that the vehicle collide with the monitoring object is determined.

SUMMARY OF THE INVENTION

However, detecting a distance to a monitoring object based on the parallax involves cost increase caused by having two cameras, as well as inconveniences of bothersome, necessary installation works including adjustment of optical axes of both cameras that should be performed strictly.

The present invention is made in view of the foregoing problems, and an object of the present invention is to provide a vehicle periphery monitoring system that can easily detect a pedestrian having a possibility to collide with the vehicle to which the monitoring system is installed, with a simple configuration.

A vehicle periphery monitoring system of the present invention that overcomes the above-described problem determines whether an observation object is a pedestrian relatively approaching the vehicle to which the monitoring system is installed based on a change rate of a size of an observation object image between a plurality of captured images captured at different time points by the onboard camera, and presence or absence of deformation of the image of the observation object between the captured images.

According to the present invention, it is possible, with a simple configuration, to easily detect a pedestrian having a possibility to collide with the vehicle to which the monitoring system is installed. Problems, configurations and effects other than those described above are clarified in the following description of the embodiment.

DETAILED DESCRIPTION OF THE PREFERRED EMBODIMENT

Next, a vehicle periphery monitoring system according to the present embodiment is described with reference to the drawings.

Figure 1:
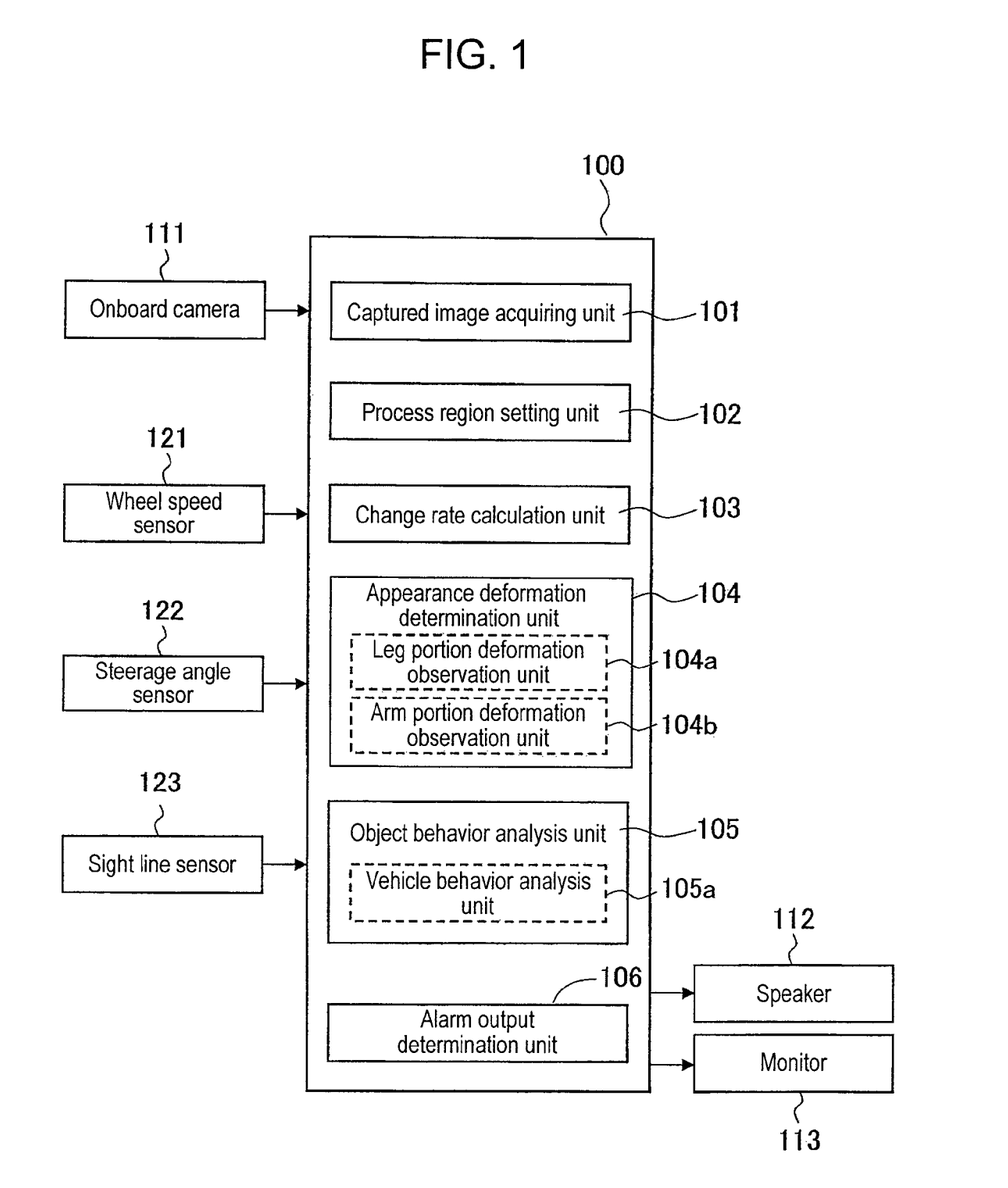
FIG. 1 is a diagram of system configuration of a vehicle periphery monitoring system according to the present embodiment.

FIG. 1 is a diagram for explaining a configuration of a vehicle periphery monitoring system according to the present embodiment.

A vehicle periphery monitoring system 100 is for monitoring whether a pedestrian is moving in such a relative direction to approach the vehicle to which the monitoring system is installed, and configured in an image processing ECU that is not shown. The vehicle periphery monitoring system 100 is not limited to those which are configured within the image processing ECU, but may be configured in a dedicated ECU or other onboard ECUs such as an ECU for an onboard camera 111. Further, it may be configured as a combination of a plurality of ECUs.

The vehicle periphery monitoring system 100, as shown in FIG. 1, comprises a captured image acquiring unit 101 that acquires a plurality of captured images captured in different time points by the onboard camera 111, a process region setting unit 102 that sets a process region for detecting an observation object in the image acquired by the captured image acquiring unit 101, a change rate calculation unit 103 that calculates a change rate of size of an observation object image in the process region between captured images; an appearance deformation determination unit 104 that determines presence or absence of deformation in the image of the observation object in the process region between the captured images; an object behavior analysis unit 105 that determines whether an observation object is a pedestrian moving in such a relative direction to approach the vehicle to which the monitoring system is installed, based on a change rate calculated by the change rate calculation unit 103 and a result of determination by appearance deformation determination unit 104; an alarm output determination unit 106 that determines whether to perform alarm output based on the result of analysis by the object behavior analysis unit 105.

To the input side of the vehicle periphery monitoring system 100 are connected an onboard camera 111 for observing the vehicle periphery, such as, the front and the back of the vehicle, a wheel speed sensor 121 that acquires a revolution speed of each wheel of the vehicle, a steerage angle sensor 122 that acquires a turning angle of a steering wheel; a sight line sensor 123 that detects the direction in which a visually focus of attention of the driver resides, and to the output side thereof are connected a speaker 112 that emanates a warning sound and a monitor 113 that displays an object because of which the alarm is output. The onboard camera 111 is a so-called monocular camera, and mounted on the vehicle to capture the periphery of the vehicle to which the monitoring system is installed. The onboard camera 111 is not limited to a rear camera that captures the back of the vehicle, and it may be a front camera that captures the front of the vehicle or a side camera that captures the flanks of the vehicle, or may be provided with all of the above.

Next, a configuration of the vehicle periphery monitoring system 100 is described in detail.

The captured image acquiring unit 101 feeds an analog video signal output from the onboard camera 111 to an image memory after converting it to digital data. In this operation, the time point of image capturing or of feeding the image to the image memory (hereafter referred to as an image capturing time point) is kept in association with the image data fed to the image memory. This provides an effect of enabling calculation of an enlargement ratio of a pattern per unit time without being affected by variation of the processing period caused by computational load. It is possible, without considering the computational load, to capture images at a predetermined time interval and in a constant period. In this case, it is possible to omit keeping the image capturing time point. By omission of keeping the image capturing time point, reduction in memory usage and accelerating a video image acquisition process can be expected as an effect. In the case of a common analog video signal of BT601 standard or the like, since there are predefined specifications for the conversation to digital data, and A/D converter IC chips or the like are on the market, the description of the details for conversion method is omitted herein.

Figure 2A:
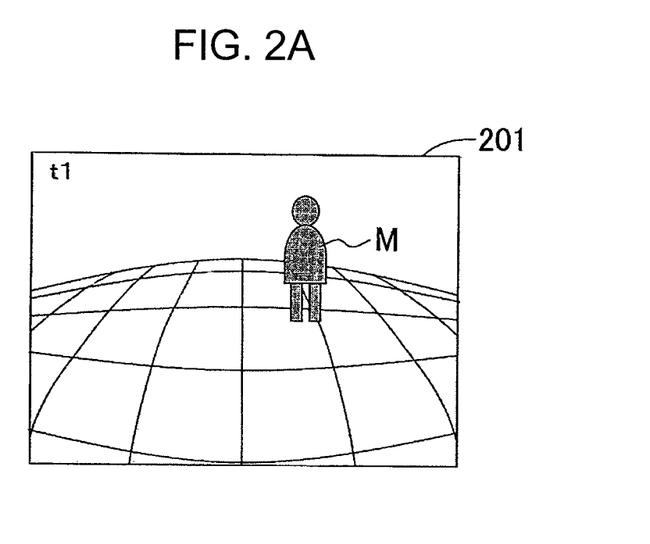
FIG. 2 is an example of a diagram showing an image obtained by the capturing device.
Figure 2B:
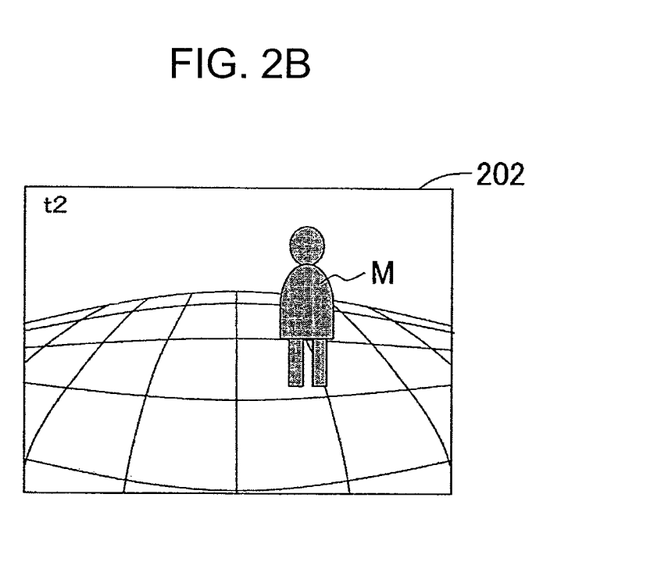
Figure 3A:
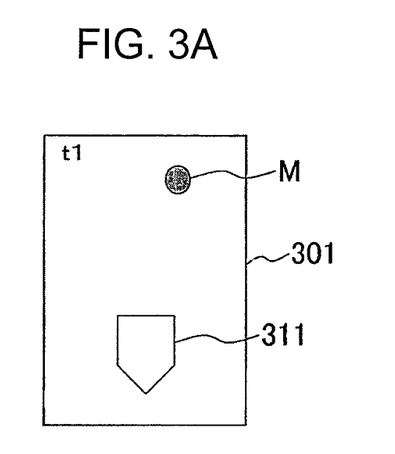
FIG. 3 is a diagram for explaining a relative relationship of the object and the periphery of the vehicle to which the monitoring system is installed at each time point.
Figure 3B:
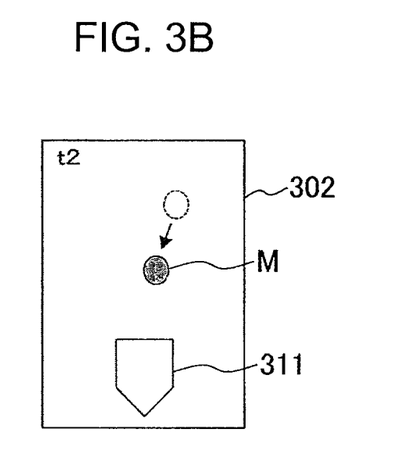

FIG. 2 shows images captured by an onboard camera at image capturing time points t1, t2. FIG. 3 is a schematic diagram showing the state of FIG. 2 viewed from the above downwardly. A pedestrian M, at the image capturing time point t1, as the state 301 shown in FIG. 3A, is standing at a position apart from and at the of back the vehicle 311 to which the monitoring system is installed, and captured as a small object in the image 201 in FIG. 2A. On the other hand, at the image capturing time point t2, as shown in the state 302 of FIG. 3B, the pedestrian M has approached in such a relative direction to approach the vehicle 311 and captured larger in the image 202 in FIG. 2B than in image 201.

The process region setting unit 102 sets a plurality of process regions on the image memory. When the distance to and the size of the pedestrian detection are postulated, it is possible to calculate the size of the observation object that can be observed on the image. A process region having a size of the observation object is set so as to be arranged on the screen to mutually be overlapped on their margin. The process region setting unit 102 changes each position in the process region based on a result of behavioral analysis of the vehicle by a below-mentioned vehicle behavior analysis unit 105a. For example, when the vehicle to which the monitoring system is installed is turning, the relative relationship between a position in the 3D space corresponding to a process region set in the image and the vehicle to which the monitoring system is installed change. Therefore, once-set process region is set again according to the amount of turning.

With reference to FIG. 4, a method for calculating the size of the observation object will be described.

Figure 4A:
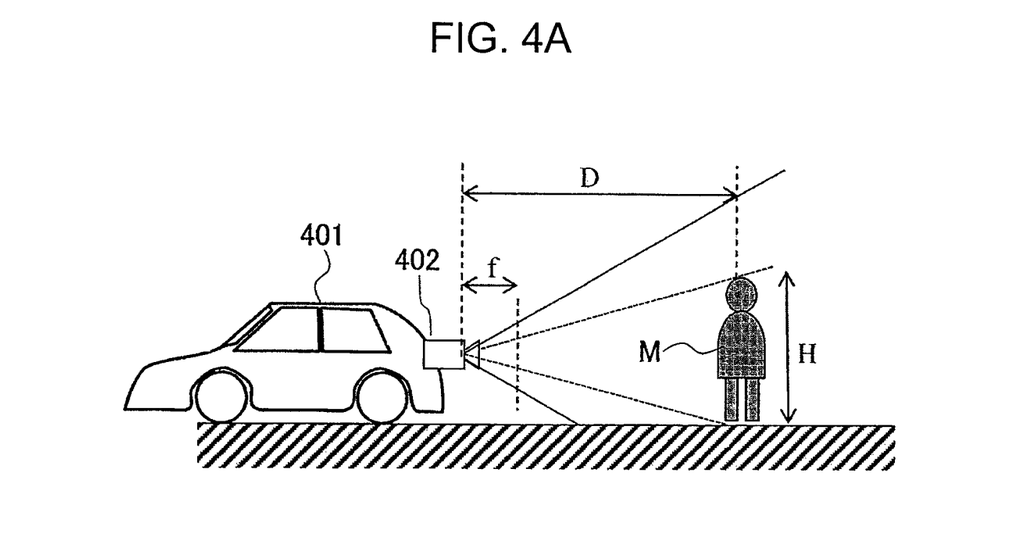
FIG. 4 is a diagram for explaining a postulation for setting a process region.
Figure 4B:
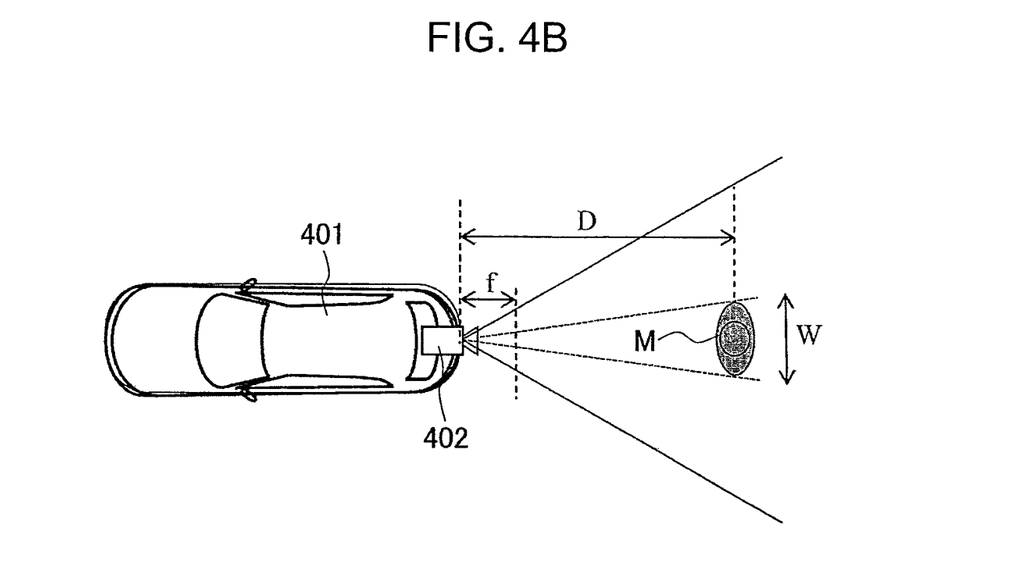

FIG. 4 is a diagram that describes a method for setting a process region. FIG. 4A is a diagram showing the positional relationship between the pedestrian and the vehicle from a side, and FIG. 4B is a diagram showing the state of FIG. 4A viewed from the above downwardly.

A vehicle 401 has a rear camera 402 as an example of the onboard camera 111 of FIG. 1. It is postulated that at the back of the vehicle 401, the pedestrian M is standing. As shown in FIG. 4A and FIG. 4B, when the distance to the pedestrian M from the rear camera 402 is postulated as D, the size of the pedestrian M is postulated so that the width and height thereof are postulated respectively as W and H, the focal length of the rear camera 402 is postulated as f, and the conversion factor for the distance in the real world and the distance in the image are postulated as cu, cv. Further, when the size of the pedestrian M in the image is assumed so that the width and height thereof are postulated respectively as u and v, the following formula establishes:

$$W:D=u:f\ H:D=v:f$$

Based on the above, u×v is determined as the size of one process region where $$u=f\times W\div D\times cu$$

$$v=f\times H\div D\times cv$$

The process regions having the sizes defined in this manner are arranged in the captured image so that they partially overlap with each other. This amount of overlap of the process region is set to be, for example, 50% of width u of the pedestrian M. This makes it possible, even when the pedestrian is not located exactly at the midrange of the process region, since at least 50% or greater of the region is occupied by the texture of the pedestrian region, to lessen the effect of the background pattern in the back of the pedestrian, so that enlargement ratio of the pattern can be calculated conveniently.

Further, the above-described process region setting unit 102, when changing each position in the process region based on the result of the behavioral analysis of the vehicle, sets the process region by moving it by relative amount, projected on the image plane, of movement that is calculated based on the amount of movement of the pedestrian M and the amount of movement of the vehicle to which the monitoring system is installed. This makes it possible to continuously grasp a pedestrian in the same process region even while the vehicle to which the monitoring system is installed is moving.

When it is assumed that the amount of movement in the real space environment of the pedestrian M is adequately small, the proportion of the behavior of the vehicle to which the monitoring system is installed is to become larger than the relative amount of movement. Therefore, only the amount of movement of the vehicle to which the monitoring system is installed may be accorded with to move and set the process region. Further, when sufficient process regions are densely arranged, instead of changing each position in the process region, the enlargement ratio among the distinct process regions may be calculated according to the relative amount of movement that is calculated.

The vehicle behavior analysis unit 105a, with the steerage angle detected by the steerage angle sensor 122 and a vehicle speed, a speed of each wheel and a revolution amount of each tire detected by the wheel speed sensor 121 and calculated, as inputs, and by using knowledge including length of the axle shaft and the wheel base, calculates the amount of change in a degree of turning angle of the vehicle to which the monitoring system is installed, which is accompanied by travelling thereof. By storing the result of calculation, it is possible to calculate the position of the vehicle to which the monitoring system is installed with respect to a reference point in a world coordinate. The reference point in the world coordinate may be reset so that the position on system activation or the start of an image recognition operation becomes the origin of the coordinate systems or may be set with respect to the latitude or longitude of the earth by using the result of positioning of the vehicle, to which the monitoring system is installed, by the GPS system.

By setting the process region in the manner as stated above, since the image of the pedestrian to be the detection object is included to have a sufficient size in any of the arranged process regions at least in the postulated distance, it becomes easy to perform detection by below-mentioned means.

Further, since it is possible to cover an extent intended to be detected with the minimum number of process regions, it becomes possible to reduce the calculation cost spent by the process. In other words, it becomes possible to optimize the calculation amount while improving the detection performance at the set distance.

Furthermore, as in the case of the fisheye lens or the anamorphic lens, when a distance is postulated and the size of the actual matter reflected on 1 pixel differs between the center section and the periphery of the image, it becomes possible to further improve the detection performance in the neighborhood of the set distance by altering the process region according to the portion of the image instead of setting the process region uniformity.

The change rate calculation unit 103 calculates the change rate of the size of the observation object in the corresponding process regions between the images for a plurality of captured images captured at different time points by the onboard camera 111 and acquired by the captured image acquiring unit 101. For the calculation of the change rate, for example, dynamic programming may be employed.

Dynamic programming is a technique to obtain correspondence between two patterns. The luminance value distribution of two dimensional image patterns is projected on one-dimension by postulating an appropriate one axis and dynamic programming is applied to this one-dimensional wave form projected.

In detecting a pedestrian based on an image, since a walking state, such as opening and closing in the leg portions and swing of arms, holding of luggage, the apparent shape changes momentarily. Therefore, it is difficult to calculate change rate by simply associating the images with each other. Therefore, by projecting luminance value distribution of image patterns in the two dimension on a one-dimension (see, for example, FIG. 5), it is possible to associate luminance value distribution with deformation of the image in a robust manner so that the change rate among the images associated with different time points can be measured.

Here, since the vertical length in the body height direction of the pedestrian is longer than the horizontal breadths, such as those of shoulder or waist of them, when measuring is performed on the image, it becomes possible to perform more stable and accurate measuring of the change rate of the image by projecting on axis of ordinate (Y-axis). In other words, for example, when the enlargement ratio is 2%, and as compared with the change of 1 pixel at the time when a pedestrian comprising 50 pixels in the shoulder length (horizontal) direction on the image becomes 51 pixels, the change of 4 pixels at the time when the pedestrian having 200 pixels in the image body height (vertical) direction becomes 204 pixels results in more stabile observation and less errors in quantization when the quantization error at the time of capturing is considered. Therefore, when the change rate of the observation object is calculated, by combining projecting onto the axis of ordinate (Y-axis) that is the body height direction as an optimal axis for projection, an effect of improving the stability and accuracy in the change rate measurement is achieved.

When a pitch angle of the vehicle changes, such as the case where the vehicle to which the monitoring system is installed accelerates or decelerates or when the vehicle runs on a not-flat road surface or road surface having inclination changes where the object moves in the vertical direction on the image, projecting the luminance distribution on the axis of abscissas (X-axis) of the image and observing the change in the width can more contribute to improving stability and accuracy in the measurement of the change rate. Which one of the axes is preferable for projecting the luminance distribution is determined by determining whether the pitch angle of the vehicle is changing.

For example, the vehicle state obtained from sensor information of sensors including a throttle opening angle sensor, a brake sensor and acceleration sensor and a vehicle height sensor are observed in time series, and when the amount of the change in the vehicle state has become larger than a threshold set in advance, it can be determined that the pitch angle is changing. Further, it is possible for example, to extract a white line or a boundary of lane called botts dots from the image, and estimate, based on the offsets of the vanishing point coordinates calculated therefrom, that pitch angle of the vehicle is changing.

Further, in a image capturing device such as a CMOS sensor of a rolling shutter scheme, which does not perform shutter control for the whole screen simultaneously, and the capturing timings are different for each scanning line of the screen, since the position where a walking pedestrian is observed is captured to be distorted, there is an effect that calculation of the enlargement ratio in which offsets in time sequence are reduced can be performed by projecting onto the axis orthogonal to the scanning line.

By using FIG. 5 and FIG. 6, one example of a method for calculating the change rate will be described.

Figure 5A:
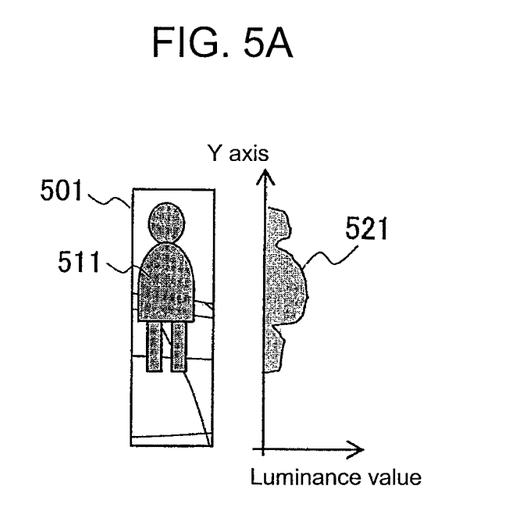
FIG. 5 is a diagram showing one-dimensional luminance value wave form.
Figure 5B:
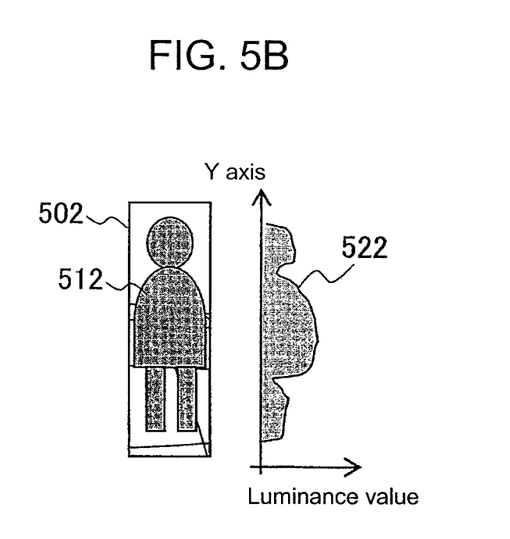

FIG. 5 is a diagram showing one-dimensional luminance value wave form. FIG. 6 is a diagram for explaining a method for calculating the enlargement ratio from the one-dimensional luminance value wave form. FIG. 5A is a diagram of a wave form in which the luminance values in the process region of the image at the image capturing time point t1 are projected on the Y-axis. FIG. 5B is a diagram of a wave form at a time later than the image capturing time point t1, in other words, the diagram of the wave form in which image luminance values within the process region of the image at the image capturing time point t2 that is different time point from the capturing time t1 are projected on the Y-axis.

The change rate calculation unit 103, as shown in FIG. 5A and FIG. 5B, projects the luminance values of the images 501 and 502 within the process regions at the image capturing time point t1 and the image capturing time point t2 on the Y-axis of the image, and generates one-dimensional luminance value wave forms 521 and 522. With a luminance value I (x, y) at each point within the process region u×v size, the luminance value wave form J(y) can be obtained by the following formula:

$$J(y)=\Sigma I(i,j)(1 \leq x \leq u, j=y)$$

With the luminance value wave form against image capturing time point t1 and image capturing time point t2 being J1, J2, the following establishes:

$$(rxi, ryi)=\mathrm{argmin}\Sigma(J1(xm)-J2(yn))^2$$

$1 \leq m \leq u$, $1 \leq n \leq v$, $xm \in rxi$, $yn \in ryi$

The inclination $\phi'$ of rxi, ryi in this operation represents the change rate of the size of the pedestrian within the process region corresponding to each other in each image at the image capturing time point t1 and the image capturing time point t2. An inclination $\phi$ in a unit time interval (T−t1) is calculated, based on the inclination (V to calculate the change rate in the unit time interval (T−t1) (change rate=1/inclination $\phi$).

Distances to the pedestrian at the image capturing time point t1 and the image capturing time point t2 are denoted as d1 and d2 and the sizes of the pedestrian on the image are s1, s2; a distance to the pedestrian at time T is denoted as dT; and the size of the image of the pedestrian is denoted as sT. When it is postulated that the moving speed of the pedestrian does not change largely between times t1 and t2, the following formula establishes:

$$d1 \times s1 = d2 \times s2 = dT \times sT$$
$$\phi = sT/s1$$
$$\phi' = s2/s1$$

Further, the following establishes:

$$\phi = 1/\{1+\{(T-t1)/(t2-t1)\} \times (s1/s2-1)\}\phi'$$

Corresponding process regions may be, for example, when the vehicle to which the monitoring system is installed is not moving, the same coordinates of the image. However, when the vehicle to which the monitoring system is installed is in a turning movement, the coordinate may be moved according to the degree of turning angle of the vehicle to which the monitoring system is installed.

Figure 6A:
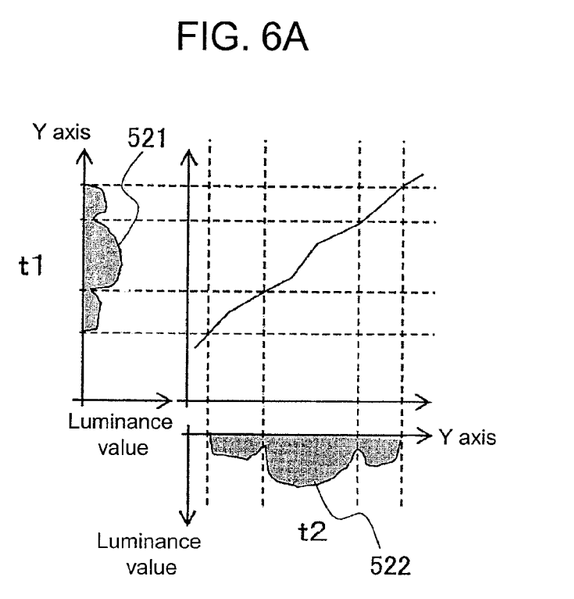
FIG. 6 is a diagram for explaining a method for calculating an enlargement ratio of one-dimensional luminance value wave form.
Figure 6B:
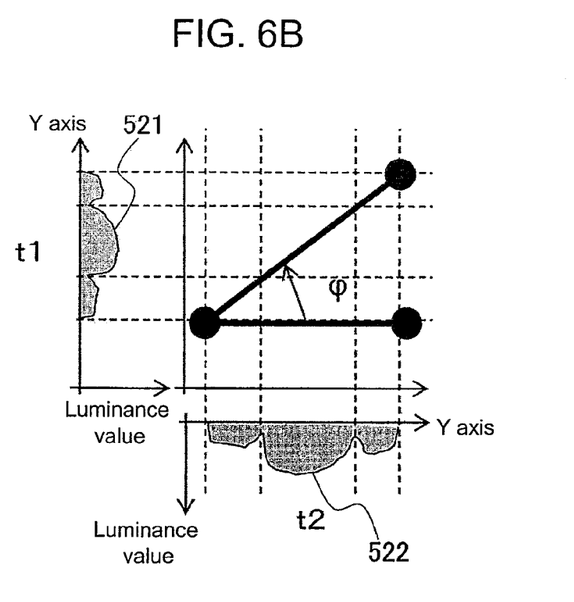

For example, as shown in FIG. 6A, when a chart in which the luminance value 521 at the image capturing time point t1 is plotted on the axis of ordinate, and a luminance value 522 at the image capturing time point t2 is plotted on the axis of abscissas is prepared, an upward-sloping graph line map can be prepared. The angle of inclination $\phi$ of the arbitrary approximation curve of the graph line map is a change rate. For example, where there is no change of the size of the pedestrian M between the image capturing time points t1 and t2, the angle of inclination $\phi$ is 45 degrees, but becomes less as the pedestrian M approaches the onboard camera 111, while the change rate becomes large.

The appearance deformation determination unit 104 comprises a leg portion deformation observation unit 104a that observes apparent deformation of a leg portion in the image of the observation object, and an arm portion deformation observation unit 104b that observes apparent deformation of the arm portion in the image of the observation object. The apparent deformation refers to the fact that a matter in a 3D space actually not having deformed is observed as a plurality of different shapes having the relationship of affine transformation in a process of being projected onto an image plane captured by the camera when being observed by a plurality of different viewpoints. The leg portion or the arm portion is not bent except for the joints and each link length does not change either. However, when having been captured and projected on the image plane, the angle or the length look changing on the image depending on the positional relationship of the camera and the character.

The leg portion deformation observation unit 104a observes apparent deformation of the lower half within the process region at the image capturing time point t1 and the image capturing time point t2. When a pedestrian is included within the process region, since the lower half of the process region corresponds to the leg portion, it is possible to distinguish that the pedestrian is not in the stationary state but is walking by moving the leg portion by determining presence or absence of the apparent deformation in the lower half of the process region.

In the case of the pedestrian, since the leg portion deforms, by obtaining the difference of the image of the lower half of the process region of and accumulating the luminance value of the difference and comparing it with the threshold, it is possible to determine whether appearance is deforming. In other words, when the sizes at the image capturing time point t1 and the image capturing time point t2, the luminance values of each point within the process region having the size of u×v are I1(x, y), I2(x, y), a threshold to determine that deformation is taking place is denoted Thr1, the following formula establishes when the deformation is taking place.

$$\Sigma |I1(i,j)-I2(i,j)| \geq Thr1$$

$$1 \leq i \leq u, v/2 \leq j \leq v$$

The leg portion deformation observation unit 104a compares the accumulation of the absolute values of luminance value difference against the lower half of the process region with the threshold Thr1 according to the above formula and when the formula establishes, determines the leg portion is deforming, and when the formula does not establish, determines that the leg portion is not deforming.

Although the arm portion deformation observation unit 104b is similar to the leg portion deformation observation unit 104a, it obtains a difference from a different region, and accumulates a luminance value difference for the range from ⅛ to ½ of the upper part of the process region. When the threshold for determining that deformation is taking place is denoted as Thr2 and when the deformation is taking place, the following formula establishes.

$$\Sigma |I1(i,j)-I2(i,j)| \geq Thr2$$

$$1 \leq i \leq u, v/8 \leq v/2$$

The arm portion deformation observation unit 104b compares the accumulation of the absolute values of the luminance value difference against the upper region of the process region with threshold Thr2 according to the above-described formula, and when the formula establishes, determines that the arm portion is deforming, and when the formula does not establish, determines that the arm portion is not deforming. In the above-described formula, the lower half of the process region and the range from ⅛ to ½ of the upper region is used. However, shapes of the characters may be postulated to flexibly set range.

The appearance deformation determination unit 104, when at least one of the leg portion deformation observation unit 104a and the arm portion deformation observation unit 104b determines that the appearance is deforming, determines that there is deformation of the image that is the observation object.

The object behavior analysis unit 105, based on the result of the change rate calculation unit 103 and the appearance deformation determination unit 104, determines whether the observation object is the pedestrian moving in such a relative direction to approach the vehicle to which the monitoring system is installed. For example, when the change rate calculation unit 103 determines that the image of the observation object is changing in the direction to enlarge and the appearance deformation determination unit 104 determines that the image that is the observation object is deforming, the object behavior analysis unit 105 determines that the observation object is the pedestrian relatively approaching the vehicle to which the monitoring system is installed.

The alarm output determination unit 106 determines whether to output an alarm based on analysis result of the object behavior analysis unit 105. As an alarm, outputting warning sound to the speaker 112 or performing display on the monitor 113 are executed. Further, when it is determined by the sight line sensor 123 that the focus of the visual attention of the driver has already been directed to the direction of an already-detected pedestrian, it is possible to restrict the output of the speaker 112 and the monitor 113.

The vehicle periphery monitoring system 100 having the above-described configuration, when the power supply from a power-supply unit of a vehicle that is not illustrated is initiated activates, and performs a system initialization process such as clearing the memory. After the initialization is completed, the vehicle periphery monitoring system 100 performs a diagnostic process for diagnosing whether or not the functions of communication with the video image input unit and sensors that are connected are normal. Then, after completion of the initialization process and the diagnostic process, the vehicle periphery monitoring system 100 waits for the input of the initiation trigger of the vehicle circumference monitoring function.

According to the present embodiment, the diagnostic process determines whether the synchronization signal is obtained at a predetermined period from the onboard camera 111 that is the capturing unit, whether the luminance level of the video signal is within a predetermined range, and whether the communications with the wheel speed sensor 121 and the steerage angle sensor 122 are performed normally. Further, the initiation trigger includes the following three kinds: a signal indicating reverse that is output from a shift position sensor, the fact that the speed of the vehicle to which the monitoring system is installed obtained from a sensor or the like for measuring the vehicle spot is kept to a constant value or less for a predetermined period, and a timing specified by a touch panel or a switch by a user.

When the initiation trigger is input, the captured image acquiring unit 101 is used to transition to a state of acquiring the captured image of the vehicle periphery, and after the initiation trigger, captured images are acquired at predetermined periods, and input to the process region setting unit 102, the change rate calculation unit 103, and appearance deformation determination unit 104, respectively.

The process region setting unit 102 determines the size of the one process region employed by the change rate calculation unit 103, and the arrangement of each process region within the input image. For example, when an onboard camera 111 with the definition of 720×480 pixels, horizontal angle of view of 38 degrees, and the vertical angle of view of 30 degrees detects a pedestrian at the position away from the vehicle by 40$m$ having the body height of 160 cm, and the shoulder length of 60 cm, and given that the definitions of the onboard camera 111 are substantially the same at the center section and the periphery, the pedestrian is to be observed as having the breadth u=16 pixels, vertical length v=36 pixels.

The size of the detection object is the size of the one process region. By setting the process region in this way, it becomes possible to increase the proportion of the pedestrian region occupying the process region, and it becomes possible to improve the detection performance at the detection distance necessary for the system.

Further, when arranging each process region of the size within the input image, it is desirable to arrange each process region at the position where the central portion of the pedestrian at a postulated distance as detection object is included. For example, when the onboard camera 111 is installed at the height close to the waist of the pedestrian, it is preferable to arrange each process region so that the horizontal line is included. By arranging the process region in this manner, it becomes possible to grasp the pedestrian range at approximately the center section of the process region even when the distance to the pedestrian is different from the postulated distance, and it becomes possible to improve the detection performance for detecting the pedestrian at each distance.

In order to improve the detection performance in the neighborhood of the vehicle, a plurality of different distances may be postulated and one process region size may be set so that the size of the pedestrian on the image calculated therefrom is included. In other words, the pedestrian at the position away from the vehicle by the 40 m comprises 16×36 pixels in the above-described camera, and a pedestrian away from the vehicle by 20 m comprises 32×72 pixels.

In the change rate calculation unit 103, in the case where the change rate of the image of the pedestrian is calculated by projecting in the direction of the vertical axis, there is no problem if the upper part or the lower part of the process region includes an image other than a pedestrian image, which is a background image. However, since the detection performance decreases when the left and right portions includes the background image, process regions are set to 16×72 pixels. By setting the size of the process region, it becomes possible to improve the performance of detecting a pedestrian at a distance different from a postulated distance.

Further, the postulated distance to the pedestrian may be changed depending on the vehicle speed of the vehicle to which the monitoring system is installed. For example, when it is determined that Time To Collision (TTC; a remaining time until the collision is estimated to take place) is equal to 2 seconds, 22 m and 33 m respectively for the speeds of 40 km/h and 60 km/h are critical distances in the travel of the vehicle to which the monitoring system is installed. By changing thus-postulated distance to the pedestrian according to the traveling speed of the vehicle to which the monitoring system is installed, it becomes possible to perform the detection of the pedestrian suited for travelling scenes. For example, there is an effect of suppressing an over detection at a distant position in travelling with a low speed and enabling improvement of the detection performance in travelling with a high speed and to provide more convenience.

The change rate calculation unit 103, when acquiring an image by a captured image acquiring unit 101, first, accumulates the image in the image memory, and then calculates to associate images by using the above-described dynamic programming between the acquired image and the accumulated image. In the present embodiment, it is assumed that after projecting each of the process regions of the input image and accumulation image onto the axis of ordinate, associating relationships in the height direction are calculated by the dynamic programming and enlargement ratio is calculated.

For example, with the size of the process region being determined to have the product of the breadth, N, by a vertical length, 15, and a one-dimensional pattern in which the process region of the input image is projected on the axis of ordinate being I[15], and a one-dimensional pattern in which the process region of the accumulation image being projected on the axis of ordinate is J[15], it is assumed that the following is obtained as a pattern after projection:

$I[15]=\{0,0,4,5,4,2,3,6,8,9,9,9,3,0,0\}$ $J[15]=\{0,4,5,5,4,2,2,3,7,8,9,9,9,3,0\}$

When these patterns are associated with each other by dynamic programming, I[2] and J[1], I[12] and J[13] are associated with each other. However, it is assumed that I[0], J[0] denote respective initial elements, and I[14], J[14] denote respective final elements.

Furthermore, since the whole of the pattern is not occupied only by the pedestrian region and it is possible that background regions may be interfusing in the upper and lower portions, only the center sections that are associated are picked out and used in the calculation of the change rate. The extent to which the ineffective range in the upper and lower portions are set varies according to the postulation by the process region setting unit. However, in the present embodiment, the center section after deletion of approximately ten percent of the pattern lengths of the upper and lower portions is employed. The enlargement ratio to I of J in this time is calculated as (13−1+1)/(12−2+1)=1.18. The result of calculation is sent to the object behavior analysis unit.

In this way, by projecting onto a one-dimension pattern, calculating association between the patterns at a plurality of image capturing time points, and employing an enlargement ratio of the center section of the result of associating, it becomes possible to stably observe the change rate at a distance other than the postulated detection object.

When the objects are not moving or the moving speed of the object is lower than that of the vehicle to which the monitoring system is installed and the amount of movement of the vehicle to which the monitoring system is installed is calculated by using a Dead Reckoning method by using the vehicle speed and the wheel speed pulse, it is possible to measure the distance to the pedestrian based on the amount of movement and the change rate. In other words, when the vehicle to which the monitoring system is installed and the change rate during the movement to change the distance to pedestrian, from X to (X−D), is denoted as S, the distance to object is denoted as D, the following formula establishes:

$$X:(X-D)=S:1$$

When the enlargement ratio is 1.18 while the vehicle to which the monitoring system is installed moves by 3 m, the distance to pedestrian can be calculated as 19.67 m. Thus-calculated distance can be used to determine whether the enlarging object is a cause of danger.

Appearance deformation determination unit 104 determines whether the input image and the accumulation image are apparently deforming. In the leg portion deformation observation unit 104a, as described above, the process region is arranged in the position including a pedestrian central portion, and deals with a part arranged at a position lower than the horizontal line in a process region, as a leg portion region. For the range of a part lower than the horizontal line of each process region of the accumulation image and the input image, SAD (difference absolute value summation, Sum of Absolute Difference) is calculated.

Although the arm portion deformation observation unit 104b is similar to the leg portion deformation observation unit 104a, the arm portion deformation observation unit 104b obtains difference from a different range, that is, it determines deformation of a region on the upper side than the horizontal line of the process region. As described above, SAD is calculated for the upper region than the horizontal line of the process region of each of the accumulation image and the input image. The appearance deformation determination unit 104 compares the sizes of each SAD and the predetermined threshold to determine whether the apparent deformation is occurring, and sends the determination result to the object behavior analysis unit 105.

The object behavior analysis unit 105 cannot discriminate a wall or the like that is not moving from the pedestrian based merely on the change rate of the image of the pedestrian calculated by the change rate calculation unit 103, when the vehicle to which the monitoring system is installed is moving. Therefore, discrimination of the pedestrian is performed based on information from the vehicle behavior analysis unit 105a that analyzes the behavior of the vehicle to which the monitoring system is installed.

The vehicle behavior analysis unit 105a, can calculate the distance and the position by and to which the vehicle to which the monitoring system is installed has moved, when the steerage angle, vehicle speed, or the wheel revolution of each tire of the vehicle to which the monitoring system is installed, are known. For example, when the Ackermann-Jeantaud model is employed, the output value V(t), δ(t), of the wheel speed sensor 121 and the steerage angle sensor 122, the position of the vehicle (x, y) and the turning angle θ can be obtained. The Ackermann-Jeantaud model is a model in which turning angles of the inner wheel and the outer wheel at the steering wheel of the vehicle are determined as the same, and the inner wheel and the outer wheel are dealt with as one wheel at the center of an axle shaft between inner and outer wheels. When the wheel base of the vehicle is Lw, the following equations of state can be defined:

$$dx/dt=V(t)\times\cos\theta(t)$$

$$dy/dt=V(t)\times\sin\theta(t)$$

$$d\theta/dt=V(t)\times\tan\delta(t)\div Lw$$

By solving the above equations, it is possible to obtain the turning angle and the position of the vehicle to which the monitoring system is installed.

In the object behavior analysis unit 105, when the change rate obtained from the change rate calculation unit 103 is a threshold or greater, for example, when the speed of the vehicle to which the monitoring system is installed is travelling is 40 km/h, and the detection distance is set within 20 m, and a range of the enlargement ratio of 1.05 or greater and that is included in the detection range, and further, when it is determined by at least one of the leg portion deformation observation unit 104a and the arm portion deformation observation unit 104b that deforming is taking place, it is determined that the observation object is a pedestrian. The determination result is sent to the alarm output determination unit 106.

The alarm output determination unit 106, at constant time intervals, for example, of 300 msec, when a determination result that a pedestrian is approaching, has come from the object behavior analysis unit 105 three times, outputs the warning sound to the speaker 112 or superimposes a red frame or an icon on the portion of the process region of the image acquired by the captured image acquiring unit 101 as outputs to the image to the monitor 113.

As above, the present embodiment has been described in detail. However, the present invention is not limited to the above-described embodiment, and may be modified and subjected to design variation within the scope of the spirit of the present invention set forth in the claims. For example, the embodiments are explained in detail to enhance the understandability of the present invention, and not always limited to one comprising all the elements described above. Further, any part of the embodiment can be subjected to addition of other configurations, deletion, or replacement with other configurations.

DESCRIPTION OF SYMBOLS

100 vehicle periphery monitoring system
101 image acquiring unit
102 process region setting unit
103 change rate calculation unit
104 appearance deformation determination unit
104a leg portion deformation observation unit
104b arm portion deformation observation unit
105 object behavior analysis unit
106 alarm output determination unit
111 onboard camera
M pedestrian

What is claimed is:

1. A vehicle periphery monitoring system that performs monitoring of a vehicle periphery based on an image of the vehicle periphery captured by an onboard camera, comprising:
- a captured image acquiring unit that acquires a captured image captured by the onboard camera;
- a process region setting unit that sets a process region for detecting an observation object in the captured image acquired by the captured image acquiring unit; and
- an object behavior analysis unit that determines whether the observation object is a pedestrian relatively approaching the vehicle to which the monitoring system is installed based on a change rate of a size of an image of the observation object between a plurality of captured images captured at different time points in the process region, and presence or absence of deformation of the image of the observation object between the plurality of captured images captured at different time points in the process region,
- wherein the process region setting unit arranges a plurality of process regions with sizes predetermined based on the size of the pedestrian to be an image capturing object in the captured image.

2. The vehicle periphery monitoring system according to claim 1, wherein the object behavior analysis unit uses a process region at a position that differs in response to movement of the observation object relative to the vehicle when determining whether the observation object is the pedestrian relatively approaching the vehicle to which the monitoring system is installed, based on the plurality of captured images captured at different time points.

3. The vehicle periphery monitoring system according to claim 1, further comprising a change rate calculation unit that calculates a change rate of the size of the image of the observation object, wherein the change rate calculation unit calculates a change rate of the size of the image of the observation object using the image of the observation object in a region including at least a center section of the process region in the vertical direction.

4. The vehicle periphery monitoring system according to claim 1, further comprising an appearance deformation determination unit that determines presence or absence of deformation of the image of the observation object, wherein the appearance deformation determination unit determines presence or absence of deformation in at least one of the upper half and the lower half of the process region.

5. The vehicle periphery monitoring system according to claim 1, wherein the process region setting unit allows the plurality of process regions to mutually be overlapped on their margin.

6. The vehicle periphery monitoring system according to claim 1, further comprising a change rate calculation unit that calculates a change rate of the size of the image of the observation object, wherein the change rate calculation unit determines to use a change in the size in the vertical direction or a change in the size in the horizontal direction on the image of the observation object depending on whether the pitch angle of the vehicle is changing and calculates a change rate of the size of the image of the observation object using the change determined to be used.

7. The vehicle periphery monitoring system according to claim 1, further comprising a change rate calculation unit that calculates a change rate of the size of the image of the observation object, wherein
- the change rate calculation unit calculates a change rate of the size of the observation object image using a one-dimensional pattern in which a luminance value distribution of two dimensional image patterns is projected on one-dimension by postulating a predetermined axis,
- an image capturing device of a rolling shutter scheme is used as the onboard camera, and
- the predetermined axis is set in a direction in which the predetermined axis intersects with the scanning line of an image.

8. The vehicle periphery monitoring system according to claim 1, wherein the process region setting unit changes the size of the process region predetermined depending on a vehicle speed of the vehicle.

* * * * *